June 30, 1964      G. N. BLISS      3,139,176
ARTICLE RESERVOIR AND TRANSFER SYSTEM AND DEVICE
Filed Sept. 5, 1961      2 Sheets-Sheet 1

*INVENTOR.*
GEORGE N. BLISS

BY Coleman, Noid & Kress

ATTORNEYS

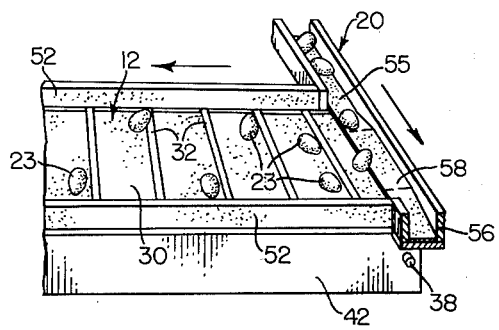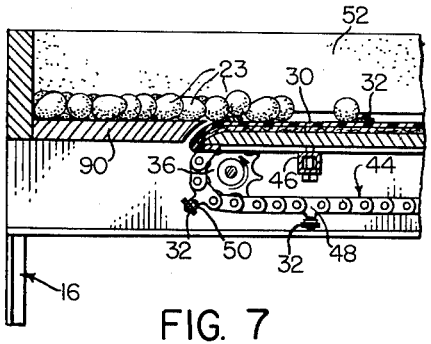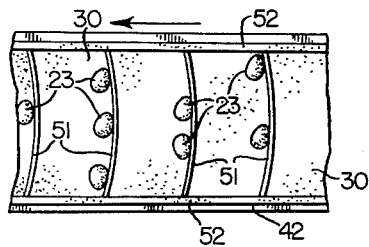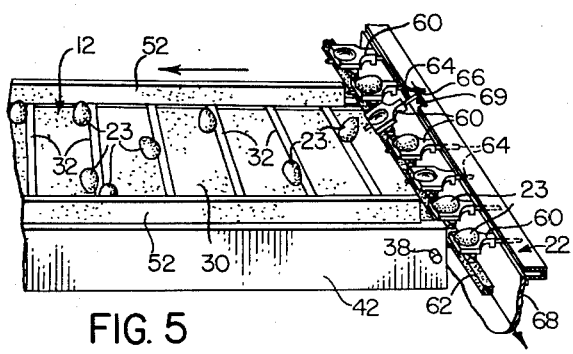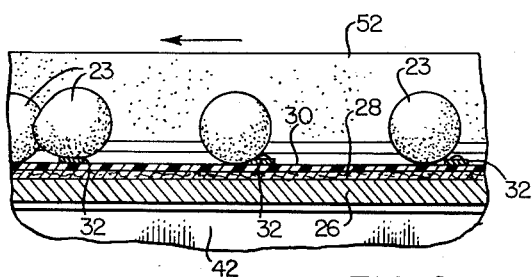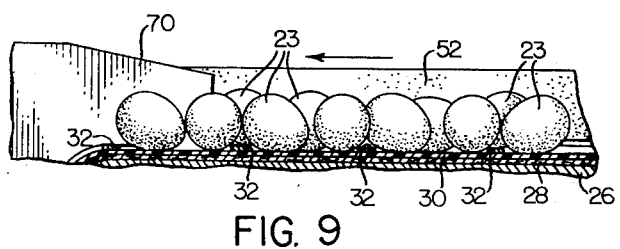

United States Patent Office 3,139,176
Patented June 30, 1964

3,139,176
ARTICLE RESERVOIR AND TRANSFER SYSTEM AND DEVICE
George N. Bliss, Birmingham, Mich., assignor to Page-Detroit, Inc., Redford, Mich., a corporation of Michigan
Filed Sept. 5, 1961, Ser. No. 136,043
19 Claims. (Cl. 198—195)

This invention pertains to an article reservoir and transfer system and device and more particularly to an egg accumulating reservoir into which eggs are discharged, moved and discharged from, without the use of a conveyor or movable means carrying the eggs individually or en masse.

The invention involves a collection device, reservoir or receptacle into which rollable articles such as eggs can be discharged. In the form or embodiment of the invention here disclosed, a substantially horizontal stationary platform is arranged to receive eggs from a conveyor or other discharge means unloading itself of eggs. Side rails adjacent the platform restrict lateral movement of the eggs and confine them in their travel to movement longitudinally of the reservoir platform. The platform is cushioned with a resilient material disposed below a relatively flexible pliant sheet of surfacing material that will not injure or crack the eggs rolling across it from end to end and/or from side to side. Suitably supported adjacent each end of the reservoir platform is a drive mechanism having egg rolling slats arranged at spaced intervals disposed transversely of the platform and moving longitudinally of and upon or substantially adjacent the platform slightly thereabove.

Heretofore, particularly in the egg handling and packing art, to applicant's knowledge, it has been desirable and considered essential to translate eggs either individually or in multiple quantities, by some kind of conveyor means. These systems call for the discharge of eggs into relatively complex egg holding equipment until sufficient quantities of a size and grade have been accumulated at each egg carton packing station to trigger their discharge into the carton. In addition, there is also relatively complex egg packing equipment, associated with the other equipment in the system, that is sometimes subject to problems of production performance. Several of these packing stations are usually embodied in each system, providing for the separate packing of eggs according to size, grade and condition. Thus, it can be readily understood that a substantially complete and flexible egg handling, sorting and packing system may be arranged with as many as from 2 to 6 or more egg packing stations, fed selectively by a moving conveyor transporting the eggs individually or in multiple lots to these packing stations. A relatively and substantially large amount of equipment is involved in such systems, in which thousands of eggs are handled, graded and packed daily.

These egg handling and packing systems include an egg receiving station or section at which eggs are loaded onto a conveyor by hand or mechanically, an egg grader, sorter and checker section in which the eggs are sized, graded and checked for condition, a distribution conveyor by which the eggs are transported individually or in multiple to egg packing stations, and the egg packing stations where eggs of the same size, grade and condition are placed in cartons by automatic mechanical equipment. The speed of the system is controlled by the speed of the egg packing equipment, which is usually the slowest operating unit of the system. For example, egg packing stations often operate at a speed of 30 cases per hour, compared to a rate of 66 cases per hour for the rest of the system. Thus, a system capable of producing more than twice the number of cases per hour is restricted by the packing stations to less than 50% of its efficiency.

Eggs of several different sizes, grades and conditions pass over the system. Not all of them go to a single packing station, but are usually distributed to several packing stations. In this way the efficiency of the system is still further reduced by virtue of the distribution of eggs and the holding of eggs at packing stations for quantities sufficient to be charged into cartons.

In addition to the variation in operating ratio of the several parts of the system, the operator is also faced with changeovers in packing materials, cartons or cases, at the packing stations, with jam-ups or equipment failure at these stations, and other problems bringing about a stoppage of the equipment not directly related to the handling, checking and distributing portions of the system. It is therefore a serious monetary and production loss to an operator of such a system to face a complete stoppage of the equipment when some failure occurs at a packing station. Not only are there no eggs packed at the station where the problem has occurred—for whatever reason, but there is no packing at any other of the many stations. The entire system and equipment must be stopped until the problem is remedied. For whatever amount of time is involved, be it minutes or hours, no production at any packing station proceeds, resulting in a loss multiplied by the number of packing stations at which there were no problems or failure.

The applicant has conceived and created an egg reservoir and transfer system and device whereby eggs may be continually discharged into the device, accumulated for a substantial period of time depending upon the length and width of the reservoir platform, and discharged from the reservoir platform into an egg carton packing device. Because each packing station is provided with its own reservoir, eggs can be accumulated by the device without a stoppage or a slowing of the entire egg handling, sorting and distributing system. The packing stations continue to operate at their normal efficient speed, and the remainder of the system operates at its substantially higher speed, the function of the accumulating reservoir providing an area for surge capacity or accumulation for the temporary storage of eggs adjacent packing stations which cannot pack them into cartons at the same rate at which they are arriving.

In addition, eggs of the same size and grade can be channeled to more than one packing station, depending upon the volume and rate of delivery. These eggs can be channeled without stopping the entire system, by virtue of the accumulating reservoirs. Changes can be made at packing stations without stopping the system, permitting the accumulation of eggs in the reservoirs where such changes are made. Eggs accumulate on the reservoir platform without interference during the period of the stoppage. Sometimes, the stoppage is only a moment or two or five; at other times, it may be longer. So long as the reservoir platform provides an area or space for the surge accumulation of eggs no other packing station and no other properly functioning part of the system need be stopped.

In the system of this invention, the eggs discharged onto the reservoir platform are moved or translated from the entry end of the platform to its discharge end. This is accomplished by rolling the eggs longitudinally of the platform. The eggs generally roll, simultaneously, to one or the other side rail of the platform, and always in the direction of their points, and they also roll longitudinally toward the discharge end of the platform. The rolling is effected by slats, on a translating mechanism, which traverse the platform longitudinally thereof urging the eggs toward the discharge end. During a period of accumulation, the slats being relatively thin and narrow slip or slide under the eggs without injuring them, the eggs dropping back onto the cushioned platform surface. When the packing station is again operative, the eggs are rolled by the slats into discharge and packing equipment, or to other equipment, from the reservoir platform.

It is therefore an object of the invention to provide a stationary reservoir platform for the accumulation of slidable, rolling or rollable articles such as eggs, whereon these articles can be translated from an entry position to a discharge position. Another object of the invention is to provide means for translating these rollable articles from one place to another on the platform. A further object is the provision of translating means which can be moved continually across the face of the platform while engaging and moving the articles. Still another object is to provide translating means that can slide or slip under and away from the articles leaving them upon the platform. And yet another object is to provide article translating means that rolls the articles from an entry position to a discharge position on the platform. Still a further object is to embody such an article accumulating reservoir device in a system having means for loading such device at an entry end and removing the articles from the device at a discharge end.

These and additional objects of the invention and features of construction will become more clearly apparent from the description of the invention given below, in which the terms employed are used for purposes of description and not of limitation. An illustrative embodiment of the invention is shown in the drawings annexed hereto, forming an integral part of this specification, and in which FIG. 1 is a perspective view of an article reservoir and transfer system and device illustrative of an embodiment of the invention.

FIG. 4 is a fragmentary perspective view showing a simple discharge conveyor for loading the reservoir platform.

FIG. 5 is a fragmentary perspective view, similar to FIG. 4, showing an egg distributing conveyor transporting the eggs individually and discharging them onto the reservoir platform.

FIG. 6 is a fragmentary perspective view, similar to those in FIGS. 4 and 5, showing a flexible cord-like member for rolling the eggs along the reservoir platform.

FIG. 7 is a vertical sectional view taken through a discharge station adjacent the discharge end of the reservoir platform.

FIG. 8 is a fragmentary longitudinal vertical sectional view through the reservoir platform showing the slats rolling eggs along the platform and sliding under an egg which cannot be further rolled along.

FIG. 9 is a fragmentary longitudinal vertical sectional view through the reservoir platform adjacent its discharge end showing an accumulation of eggs thereon while the drive mechanism continues to operate and move slats along the platform, the slats sliding under the eggs.

Figure 1:
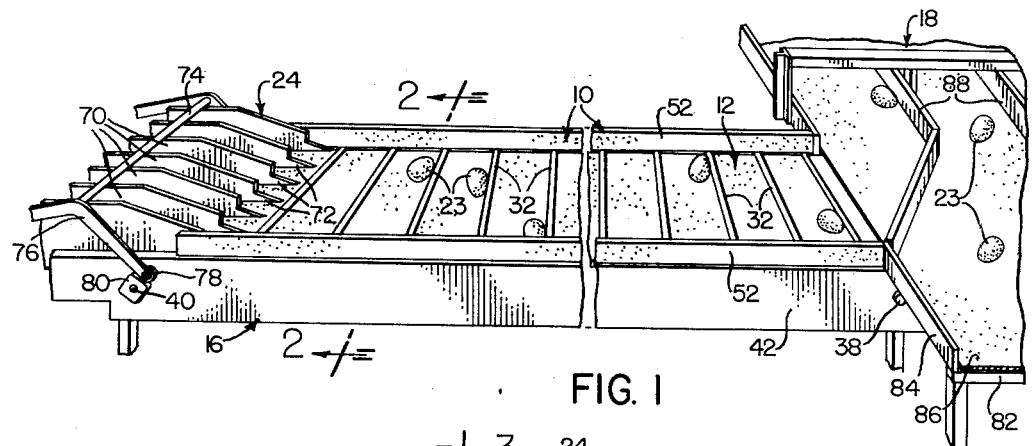
Figure 2:
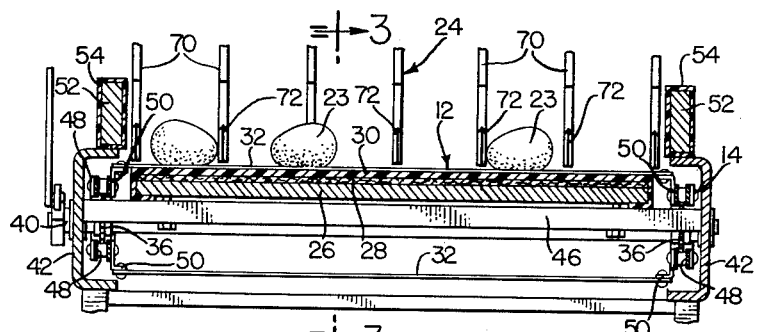
FIG. 2 is a transverse vertical sectional view taken substantially on the line 2—2 of FIG. 1.
Figure 3:
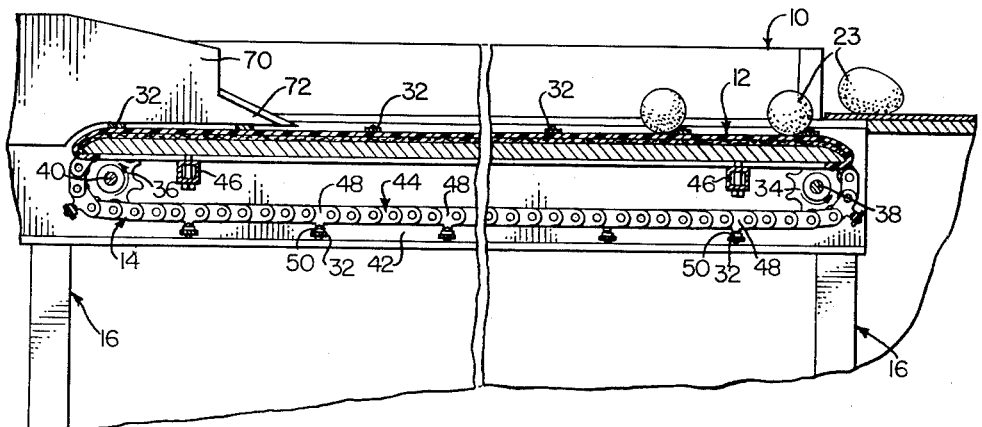
FIG. 3 is a longitudinal vertical sectional view taken substantially on the line 3—3 of FIG. 2.

As shown in the several views of the drawings, the article reservoir device 10 comprises a reservoir platform 12, an article translating mechanism 14, and framing 16 supporting the platform and translating mechanism. The system of which the device 10 is a part further embodies a conveyor means 18, 20 or 22 by which the platform 12 is loaded with slidable or rollable articles 23, and discharge or receiving means of which only a portion 24 is illustrated in FIGS. 1, 3 and 8, a discharge accumulating shelf being illustrated in FIG. 6.

It is to be clearly understood that discharge means are not absolutely required as the reservoir platform 12 may be used simply as an accumulation station for articles discharged from some sort of conveyor, even including a manual conveyor. However, in an egg handling, sorting, distributing and packing system, discharge or receiving means from the reservoir platform for egg packing devices is a required piece of equipment. Only a portion 24 of one type of such discharge equipment is shown and described herein, as illustrative of an example of discharge equipment.

The reservoir platform 12 comprises a base 26, preferably made of wood, although metal or plastic materials can also be used, a cushioning layer 28, preferably made of rubberized hair or foam rubber or other such resilient material, of a thickness sufficient to protect eggs 23 from injury and fracture while thin enough to provide a substantially planar support for the eggs which may from time to time accumulate and load an area of the platform 12, and a surfacing layer 30 of material such as a sheet of flexible plastic, textile material, rubber or rubberized fabric, or other such materials providing a surface upon which the eggs are rolled without injury and upon which the translating mechanism can move its slats or driving members 32 with a minimum of abrasive wear.

The article translating mechanism 14 includes a set of shaft mounted sprockets 34, 34 at the entry end of the device 10 and a set of sprockets 36, 36 at the discharge end. Sprocket shafts 38 and 40 are supported in bearings mounted on side frame members 42. An endless link chain 44 is mounted on and driven by the sprockets 34 and 36 on each side of the platform 12, which is supported by the transverse bars 46 affixed to the side frame members 42. At selected spaced apart links 48 on each chain 44, a small relatively thin slat 32 is secured by suitable means, such as rivets, to a bracket support 50.

The thin slats 32, preferably made of thin plastic, wood or composition material of relatively small thickness and of narrow width, are substantially non-flexing in their transverse direction although they are quite flexible longitudinally. A completely flexible member 51 is shown in FIG. 6 in which cylindrical cords or ropes are secured to the bracket supports 50 by suitable means such as clamps or pins and drawn across the surface 30 of the reservoir platform. The eggs 23 are effectively and efficiently rolled along the surface by either the slats 32 or the cords 51. The cylindrical article-moving members can be pin mounted on the bracket supports 50 so that they roll along the platform surface 30, as well as be drawn along that surface. The supports 50 may thus be provided with fixed or rotatable pins directed toward each other on each of the endless chains 44.

Drive means not shown here is associatively connected to one of the shafts 38 or 40, to drive the chains 44 and cause the slats 32 to traverse the platform surface 30 from the entry end of the platform to its discharge end.

To limit lateral travel of the articles 23 on the platform 12, side rails 52, 52 are mounted upon the side frame members 42. The rails are preferably covered with a surfacing material 54 which will not be injurious to the articles 23 that are translated across the platform. This material is similar or like one of those above described for covering the platform layer 28.

In the system of which device 10 is a part, conveyor means to discharge eggs or articles onto the platform 12 is an element. In FIGS. 4 and 5 are shown two representative forms of conveyor means. In FIG. 4, the conveyor 20 is a simple belt 55 of coated fabric or suitable conveyor material which is drawn along a channel 56. To discharge eggs 23 onto the platform surface 30 an angled ramp 58 is disposed in the channel 56 adjacent the entry edge of the platform 12. As eggs 23 are carried onto the ramp they roll down toward and onto the platform surface 30, and are there engaged by the slats 32 to be rolled along the surface of the reservoir platform. In FIG. 5, individual egg carrying trays 60 are translated by a conveyor member 62 and are pivotally supported upon pivot pins or support brackets mounted on the member 62. The trays 60 are provided with adjustably movable pins 64 extending and slidable rearwardly of the trays for sliding engagement in the channel 66 formed in the conveyor wall 68, the channel 66 restricting tilting of the trays and depositing of the eggs 23 except at release opening 69.

At the discharge end of the reservoir device 10, the system includes means for removing the articles or eggs 23. As a part of such means, as shown in FIGS. 1 and 3, the portion designated by the reference numeral 24 comprises a series of spaced parallel walls or plates 70 terminating at their forward ends adjacent the discharge portion of the platform 12 in angled pointed tips 72. A transverse bar 74 connects the plates 70 at their top edges and secures a lever 76 at one end. The lever terminates at its forward end in a roller 78 arranged to ride the cam 80 mounted on the outboard end of shaft 40. The other end of lever 76 is not shown but it is pivotable on a pin so that as the cam 80 rotates, the walls 70 are raised and lowered by the transverse bar 74 through the oscillating action of the lever 76. When the walls or plates 70 swing upwardly their tip ends 72 also move upwardly, tilting the eggs 23 to one side or the other for further rolling movement on the platform surface 30 between the plates 70 to discharge from the platform.

The conveyor 18, FIG. 1, comprises a base 82 having side rails 84, a movable conveyor sheet 86 of a suitable flexible plastic, fabric, rubber, or composition material adapted to be drawn along the base, and a series of separator rails 88 suspended above the conveyor sheet 86 to maintain eggs 23 in channeled segregated lots according to sorted specifications of size, grade, color and condition. The conveyor sheet 86 may be of considerable width, a current size being 40 inches wide, arranged to convey eggs channeled by six or more separator rails 88 to six or more reservoir platforms 12.

As a representative example of a discharge device taking the output of articles, eggs, from the reservoir platform, the discharge tray or shelf 90 (FIG. 7), adjacent the discharge end of the platform 12, receives eggs which are being continually translated from the platform surface 30 by the slats 32 of the mechanism 14. The tray 90 may be at the plane of the surface 30 as shown, or below it, if preferred. The eggs 23 are taken manually from the tray 90 and placed directly into cartons or other containers. This type of discharge device is particularly suitable where the quantity of graded eggs is especially low and does not warrant the installation of mechanical carton or case packing equipment.

In operation, the device 10 performs in the following manner. Eggs or articles 23 are discharged onto the platform surface 30 from a conveyor 18, 20 or 22. As they are dumped or disposed onto the surface, the slats 32 driven by the link chains 44 move over the surface 30 engaging the eggs. Eggs being ovoids roll on their transverse circumferences. However, when urged along by the slats 32, an egg rolls on a line defining a transverse plane tilted toward its point. Thus, the slats roll the eggs 23 along the platform surface 30 toward one of the side rails 52. When the rail is engaged by the egg, the slat movement causes the egg to turn and now roll along toward the other rail. Continued urging by one or more slats 32 translates the egg 23 to the discharge end of the platform, as seen in FIG. 7. Should eggs 23 be confined at the discharge end of the platform, as in FIGS. 7 or 8, the slats 32 slide easily under the eggs which are not injured as they drop back onto the cushioned platform surface 30.

Whether eggs 23 are discharged onto the platform 12 by any of the conveyor means shown and described or by other means, they will be easily translated from one end to the other of the device 10 by the slats 32, which ride upon the surface 30 in engagement with the eggs 23. It will be understood that where necessary or desirable the slats 32 may be raised somewhat above the plane of the surface 30 to make improved engagement with articles 23 in their translation. Also where desirable or necessary, the slats may be modified in form from that here shown and described.

Having described the invention in its simplest terms, it is to be understood that the features of construction can be modified and varied in greater or lesser degree without departing from the essence of the invention.

I claim:

1. In a reservoir and transfer device for the translation of articles,
   a stationary reservoir platform,
   one or more movable members disposed for movement adjacent said platform and movable into engagement with said articles,
   said members being spaced apart from each other a distance sufficient to allow said articles to lie and be moved upon said platform,
   said members being capable of moving under said articles when arrested against further movement upon said platform, and
   drive means connected to said one or more members and adapted to move said members,
whereby when an article is placed upon said platform said article is translated from one position on said platform to another position thereon by moving engagement with said one or more members.

2. In a reservoir and translation device for the translation of articles,
   a stationary article supporting reservoir platform,
   one or more movable members disposed for movement adjacent said platform and movable into engagement with said articles,
   said members being spaced apart from each other a distance sufficient to allow said articles to lie and be moved upon said platform,
   said members being of such limited vertical extent that they are capable of moving under said articles when arrested against further movement upon said platform, and
   means connected to said one or more members and adapted to move said members longitudinally of said platform,
whereby when an article is placed upon said platform said article is translated from one position on said platform to another position thereon by said one or more members.

3. In an article reservoir and translating device for the translation of articles such as eggs from a position of entry to and through an area providing surge capacity or accumulation to a position of discharge from said device,
   a stationary egg supporting reservoir platform,
   an egg translating mechanism having
      one or more members disposed for movement adjacent said platform and movable into engagement with said eggs and within the plane of said eggs,
         said members adapted to translate said eggs from one position to another position upon said platform when in engagement with said eggs,
         said members being spaced apart from each other a distance sufficient to allow said eggs to lie and be moved upon said platform,
         said egg-moving members having a thickness such that said members are capable of moving under said eggs when arrested against further movement upon said platform.

4. In an article reservoir and translating device for the translation of articles such as eggs from a position of entry to and through an area providing surge capacity or accumulation to a position of discharge from said device,
a stationary egg supporting reservoir platform having
an egg cushioning layer for the surface of said platform,
and an egg translating mechanism having
one or members disposed for movement adjacent said platform and movable into engagement with said eggs and within the plane of said eggs,
said members adapted to translate said eggs from one position to another position upon said platform when in engagement with said eggs,
said members being spaced apart from each other a distance sufficient to allow said eggs to lie and be moved upon said platform,
said egg-moving members having a thickness such that said members are capable of moving under said eggs when arrested against further movement upon said platform.

5. In an article reservoir and translating device for the translation of articles such as eggs from a position of entry to and through an area providing surge capacity or accumulation to a position of discharge from said device,
a stationary egg supporting reservoir platform having
a surface layer for said eggs and
a resilient egg cushioning layer under said surface layer,
and an egg translating mechanism having
one or more members disposed for movement adjacent said platform and movable into engagement with said eggs and within the plane of said eggs,
said members adapted to translate said eggs from one position to another position upon said platform when in engagement with said eggs,
said members being spaced apart from each other a distance sufficient to allow said eggs to lie and be moved upon said platform,
said egg-moving members having a thickness such that said members are capable of moving under said eggs when arrested against further movement upon said platform.

6. In an article reservoir and translating device for the translation of articles such as eggs from a position of entry to and through an area providing surge capacity or accumulation to a position of discharge from said device,
a stationary egg supporting reservoir platform having
a horizontal, planar, rigid base,
a surface layer for said eggs and
a resilient egg cushioning layer under said surface layer,
and an egg translating mechanism having
one or more members disposed for movement adjacent said platform and movable into engagement with said eggs and within the plane of said eggs,
said members adapted to translate said eggs from one position to another position upon said platform when in engagement with said eggs,
said members being spaced apart from each other a distance sufficient to allow said eggs to lie and be moved upon said platform,
said egg-moving members having a thickness such that said members are capable of moving under said eggs when arrested against further movement upon said platform.

7. In an article reservoir and translating device for the translation of articles such as eggs from a position of entry to and through an area providing surge capacity or accumulation to a position of discharge from said device,
a stationary egg supporting reservoir platform,
an egg translating mechanism having
drive means and
one or more members disposed for movement adjacent said platform secured to and moved by said drive means,
said members being movable in a direction into engagement with said eggs and within the plane of said eggs,
said members adapted to translate said eggs from one position to another position upon said platform when in engagement with said eggs,
said members being spaced apart from each other a distance sufficient to allow said eggs to lie and be moved upon said platform,
said egg-moving members having a thickness such that said members are capable of moving under said eggs when arrested against further movement upon said platform.

8. The structure defined in claim 7, and in which said members are substantially rigid.

9. The structure defined in claim 7, and in which said members are substantially flexible.

10. The structure defined in claim 7, and in which said members are substantially flat and narrow.

11. In an article reservoir and translating device for the translation of articles such as eggs from a position of entry to and through an area providing surge capacity or accumulation to a position of discharge from said device,
a stationary egg supporting reservoir platform,
an egg translating mechanism having
an endless drive mechanism exteriorly of said platform for translating eggs upon said platform and having
one or more members disposed adjacent and transversely of said platform and secured to and moved by said drive means,
said members being movable in a direction longitudinally of said platform into engagement with said eggs and within the plane of said eggs,
said members adapted to translate said eggs from one position to another position longitudinally of said platform when in engagement with said eggs,
said members being spaced apart from each other a distance sufficient to allow said eggs to lie and be moved upon said platform,
said egg-moving members having a thickness such that said members are capable of moving under said eggs when arrested against further movement upon said platform.

12. In an article reservoir and translating device for the translation of articles such as eggs from a position of entry to and through an area providing surge capacity or accumulation to a position of discharge from said device,
a stationary egg supporting reservoir platform,
an egg translating mechanism having
an endless drive mechanism and one or more members disposed transversely of said platform and movable longitudinally of said platform into engagement with said eggs and within the plane of said eggs,
    said members having their ends secured to said drive mechanism,
    said members adapted to translate said eggs from one position to another position longitudinally of said platform when in engagement with said eggs,
    said members being spaced apart from each other a distance sufficient to allow said eggs to lie and be moved upon said platform,
    said egg-moving members having a thickness such that said members are capable of moving under said eggs when arrested against further movement upon said platform.

13. In an article reservoir and translating device for the translation of articles such as eggs from a position of entry to and through an area providing surge capacity or accumulation to a position of discharge from said device,
a stationary egg supporting reservoir platform,
an egg translating mechanism having
    one or more egg-moving members disposed for movement adjacent said platform and movable into engagement with said eggs and within the plane of said eggs,
    said egg-moving members adapted to translate said eggs from one position to another position upon said platform when in engagement with said eggs,
    said members being spaced apart from each other a distance sufficient to allow said eggs to lie and be moved upon said platform,
    said egg-moving members having a thickness such that said members are capable of passing under said eggs without injury to said eggs when said eggs meet an obstruction resisting their movement in the direction of travel.

14. In an article reservoir and translating device for the translation of articles such as eggs from a position of entry to and through an area providing surge capacity or accumulation to a position of discharge from said device,
a stationary egg supporting reservoir platform,
an egg translating mechanism having
    egg-moving members disposed for movement adjacent and transversely of said platform and movable into engagement with said eggs posited upon the surface of said platform,
    said members adapted to translate said eggs from one position to another position upon said platform when in engagement with said eggs.

15. In an article reservoir and translating device for the translation of articles such as eggs from a position of entry to and through an area providing surge capacity or accumulation to a position of discharge from said device,
a stationary egg supporting reservoir platform,
an egg translating mechanism having
    cylindrical egg-moving members of relatively small diameter but of sufficient cross-section to engage and move said eggs,
    said members disposed for movement adjacent said platform and movable into engagement with said eggs posited upon the surface of said platform,
    said members adapted to translate said eggs from one position to another position upon said platform when in engagement with said eggs.

16. In an article reservoir and translating device for the translation of articles such as eggs from a position of entry to and through an area providing surge capacity or accumulation to a position of discharge from said device,
a stationary egg supporting reservoir platform,
an egg translating mechanism having
    cylindrical egg-moving members rotatable upon the surface of said reservoir platform,
    said members disposed for movement adjacent said platform and movable into engagement with said eggs posited upon the surface of said platform,
    said members adapted to translate said eggs from one position to another position upon said platform when in engagement with said eggs.

17. In a system for distributing selected articles to discharge or packing stations,
a conveyor transporting said selected articles,
a stationary article-supporting reservoir platform adjacent said conveyor and having an area providing surge capacity or accumulation for said articles,
    means associated with said conveyor to deposit said articles upon said reservoir platform,
an article translating mechanism associated with said reservoir platform having
    one or more members disposed for movement adjacent said reservoir platform and movable into engagement with said articles and within the plane of said articles,
    said members adapted to translate said articles from their position of entry upon said reservoir platform to another position thereon when in engagement with said articles,
    said members adapted to pass under said articles when said articles meet a resistance against their continued movement upon said reservoir platform,
and article discharge or receiving means to discharge or receive said articles when said articles have been translated from said reservoir platform by said mechanism.

18. In a system for distributing articles to discharge or packing stations,
a conveyor transporting said articles,
a stationary article-supporting reservoir platform adjacent said conveyor and having an area providing surge capacity or accumulation for said articles,
    means associated with said conveyor to deposit selected ones of said articles upon said reservoir platform,
an article translating mechanism associated with said reservoir platform having
    one or more members disposed for movement adjacent said reservoir platform and movable into engagement with said articles and within the plane of said articles,
    said members adapted to translate said articles from their position of entry upon said reservoir platform to another position thereon when in engagement with said articles,
    said members adapted to pass under said articles when said articles meet a resistance against their continued movement upon said reservoir platform,
and article receiving means to receive said articles when said articles have been translated from said reservoir platform by said mechanism.

19. In a system for distributing eggs to discharge or packing stations,
a conveyor transporting said eggs,
a stationary egg-supporting reservoir platform adjacent said conveyor and having an area providing surge capacity or accumulation for said articles,
    means associated with said conveyor to deposit said eggs upon said reservoir platform,
an egg translating mechanism associated with said reservoir platform having
    one or more members disposed for movement adjacent said reservoir platform and movable into engagement with said eggs and within the plane of said eggs,
  said members adapted to translate said eggs from their position of entry upon said reservoir platform to another position thereon when in engagement with said eggs,
  said members adapted to pass under said eggs when said eggs meet a resistance against their continued movement upon said reservoir platform, and egg discharge or receiving means to discharge or receive said eggs when said eggs have been translated from said reservoir platform by said mechanism.

References Cited in the file of this patent
UNITED STATES PATENTS

| | | |
|---|---|---|
| 1,394,445 | Rogers | Oct. 18, 1921 |
| 2,796,967 | Myer | June 25, 1957 |